United States Patent [19]
Opderbeck

[11] 3,913,409
[45] Oct. 21, 1975

[54] VIBRATION GENERATOR

[75] Inventor: Rudolph G. Opderbeck, Waukesha, Wis.

[73] Assignee: Wacker Corporation, Milwaukee, Wis.

[22] Filed: Apr. 3, 1974

[21] Appl. No.: 457,590

Related U.S. Application Data
[62] Division of Ser. No. 355,580, Apr. 30, 1973.

[52] U.S. Cl. ............... 74/61; 74/52; 198/220 DB
[51] Int. Cl.² ........................................ F16H 33/00
[58] Field of Search ............... 74/595, 52, 61, 87; 198/220 DB

[56] References Cited
UNITED STATES PATENTS

| | | | |
|---|---|---|---|
| 1,056,746 | 3/1913 | Pitts | 74/52 |
| 1,186,547 | 6/1916 | Chapman | 74/595 |
| 1,326,129 | 12/1919 | Chadbourne | 74/52 |
| 1,921,182 | 8/1933 | Ferduson | 74/595 |
| 3,055,607 | 9/1962 | Schultz | 74/52 |
| 3,505,885 | 4/1970 | Waschulewski et al. | 74/61 |

*Primary Examiner*—Benjamin W. Wyche
*Assistant Examiner*—Wesley S. Ratliff, Jr.
*Attorney, Agent, or Firm*—James E. Nilles

[57] ABSTRACT

Vibratory thrust is generated by a rotating crankshaft and controlled orbital movement of a single weight pivoted to the crankpin of the crankshaft. As the crankshaft rotates the center of gravity of the weight moves back and forth on a vector through the crankshaft axis. The direction of the vector is adjustable within a substantial angular range about the crankshaft axis.

3 Claims, 9 Drawing Figures

VIBRATION GENERATOR

REFERENCE TO RELATED APPLICATION

This application is a divisional application from my co-pending U.S. patent application Ser. No. 355,580, filed Apr. 30, 1973, now U.S. Pat. No. 3,817,646, issued June 18, 1974 and entitled "Vibration Generator".

BACKGROUND OF THE INVENTION

The invention has to do with vibratory equipment such as ground tampers, rammers, concrete vibrators, screens and other apparatus of that general category. More specifically, the invention is concerned with a mechanism for generating the working vibrations of the equipment.

In vibratory apparatus of various kinds it has heretofore been common practice to use excentric weights on rotating shafts to produce the desired vibrations. In some of such previously known apparatus two or more rotating excentric weights were arranged to rotate in a predetermined phase relation to each other in order to develop a dominant reciprocating thrust force in a predetermined direction. Also, attempts have been made to obtain the same result with only one rotating excentric weight, but such one-weight vibration generators as heretofore constructed have not been entirely satisfactory in several respects, particularly in the matter of minimizing undersirable thrust components and utilizing driving power at maximum efficiency.

SUMMARY OF THE INVENTION

The invention provides an improved one-weight vibration generator wherein an orbiting weight member is arranged in such a manner that it will produce a vibratory thrust force in the direction of a vector which extends through the central orbit axis of the weight member.

The improved vibration generator embodying the invention further includes provisions for adjusting the vector of the thrust force within a substantial angular range about the central orbit axis of the weight member.

The invention further provides an improved vibration generator of the above mentioned character which involves relatively few and simple structural components, and whose overall weight may be kept low without sacrifice of strength and reliability. This is especially important with some of the hand held tools.

A further feature of the improved vibration generator embodying the invention is the provision of a driving mechanism for the orbiting weight member which is readily adjustable so as to progressively change the position the thrust vectors from a forwardly inclined position through a vertical position into a rearwardly inclined position, and vice versa.

A further feature of the improved vibration generator embodying the invention is the absence of thrust forces other than those acting in the direction of the angularly adjustable thrust vector, and the consequent optimization of the machine performance and overall efficiency.

A further feature of the vibration generator embodying the invention is a reduction of operating noise and a decreased transmission of vibratory forces to the engine due to the absence of side forces.

A further feature of the improved vibrating mechanism embodying the invention is the provision of a housing which completely seals the orbiting weight member and its associated drive mechanism against the ingress of dust and other environmental foreign matter.

When used on some apparatus such as rammers, the vibration generator embodying the invention may be directly connected to the exterior working part, and no seals will be needed for the connections.

The foregoing features and advantages of the invention will become more fully apparent from the following description of a preferred embodiment with reference to the accompanying drawings.

DRAWINGS

DETAILED DESCRIPTION

Figure 1:
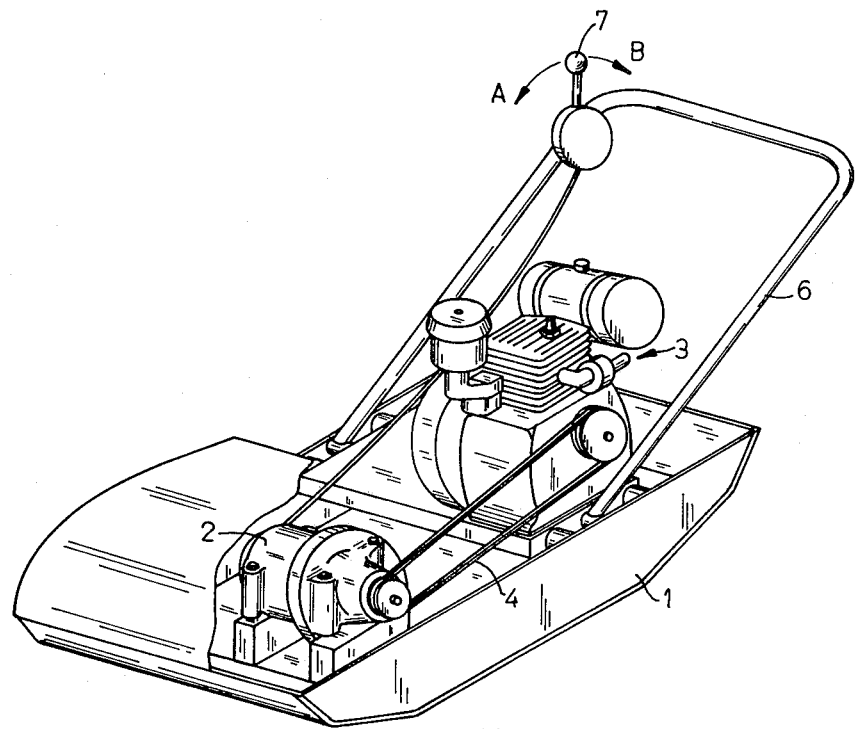
FIG. 1 is a perspective view of a compactor having a vibration generator incorporating the invention.

The compactor shown in FIG. 1 comprises a rigid, unitary tamping body 1; a vibration generator 2 mounted on top of and rigidly secured to the tamping body 1; an internal combustion engine 3 and accessories supported by the body 1; a belt drive 4 transmitting driving power from the engine 3 to the vibration generator 2; a U-shaped handle bar 6 for manipulation by an operator walking behind the compactor; and an adjusting lever 7 on the handle bar for controlling the direction in which vibratory thrust is exerted by the vibration generator 2 upon the tamping body 1, as will be explained more fully hereinbelow.

Figure 3:
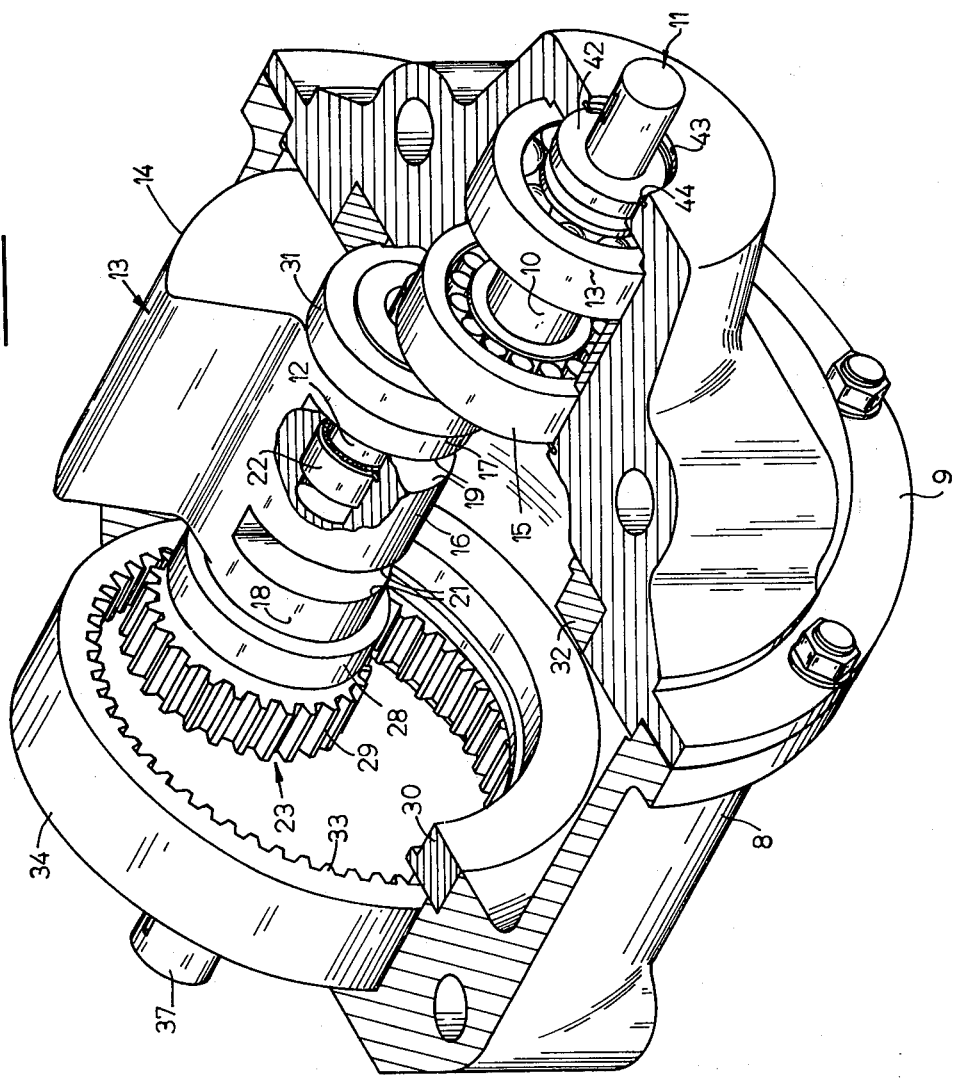
FIG. 3 is an enlarged perspective view, partly in section, of the vibration generator shown in FIG. 1.
Figure 4:
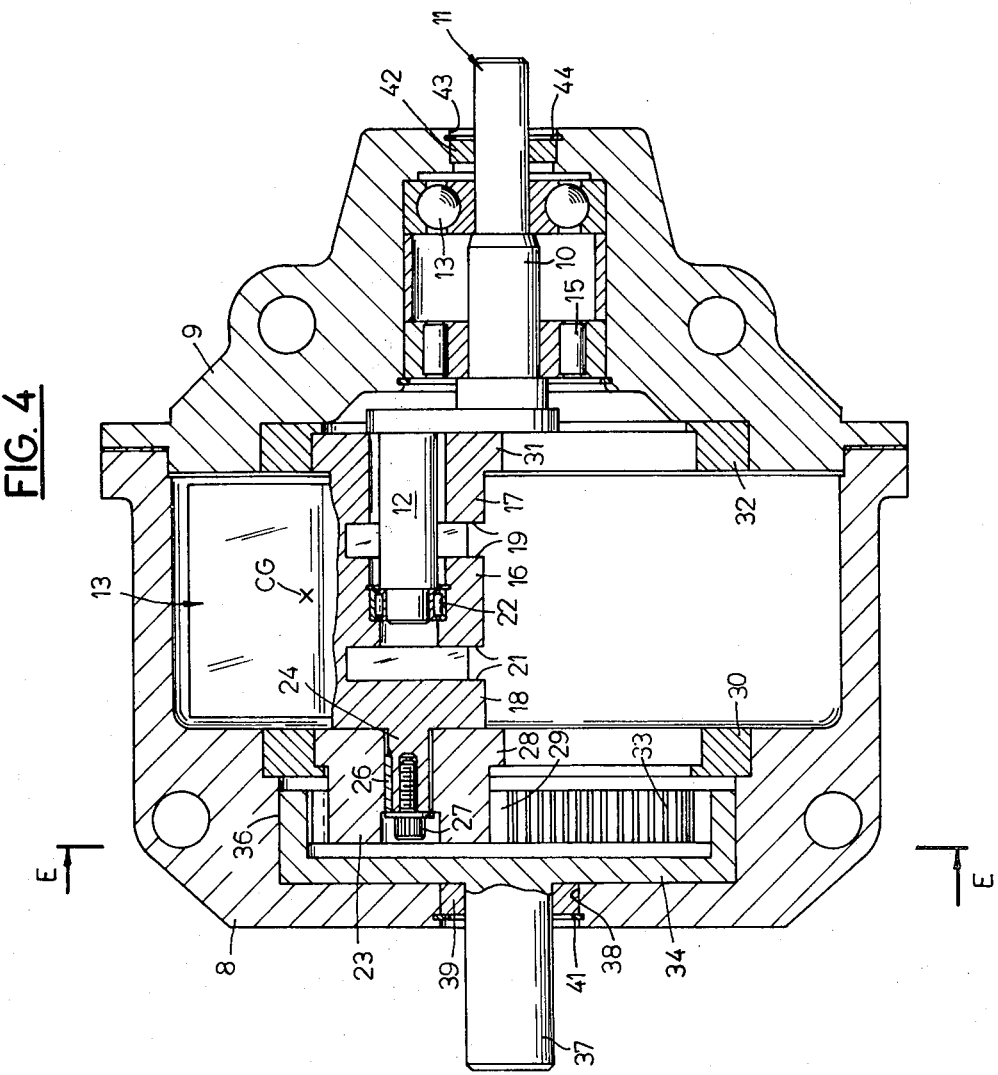
FIG. 4 is a vertical longitudinal section of the vibration generator shown in FIGS. 1 and 3, parts shown in FIG. 4 being shown in a rotatively displaced position with reference to FIG. 3.

Referring to FIGS. 3 and 4, a generally cup shaped housing section 8 is closed by an end cover 9, and the journal 10 of a crankshaft 11 is rotatably supported in a bearing opening of the cover 9 by means of axially spaced antifriction bearings 15 and 13. The crankshaft 11 has a crankpin 12 which extends partway into the housing space between the closed end of the cup section 8 and the end cover 9. An orbiting weight 13 within the cup section 8 comprises a sector shaped body portion 14 (FIG. 3), a central radial prong 16, and two radial prongs 17 and 18 at the axially opposite sides of the mounting prong 16 and spaced therefrom by recesses 19 and 21, respectively. The radial prongs 16 and 17 are axially apertured to accommodate the crankpin 12 of the crankshaft 11, and a needle bearing 22 is seated on the end of the crankpin 12 and fitted into the axial aperture of the mounting prong 16 so as to pivotally connect the weight member 13 with the crankpin 12.

At the side of the weight member 13 next to the bottom of the cup shaped housing member 8 a pinion 23 is rigidly secured to the radial prong 18 in axial alignment with the crankpin 12 of the crankshaft 11. A stub shaft 24 on the prong 18 extends into a central axial bore of the pinion 23, and a key 26 and a cap screw 27 secure the pinion 23 in axially and rotatively fixed position to the weight member 13. The pinion 23 comprises a smooth cylindrical collar 28 adjacent to prong 18 of the weight 13, and a circumferential series of external gear teeth 29 at its axially outer end. The purpose of the collar 28 is to provide for the transmission of centrifugal force from the weight member 13 to an annular guide track 30 within the housing section 8. A similar collar 31 is secured to the radial prong 17 of the weight member 13 for cooperative engagement with an annular guide track 32 within the housing cover 9. The cylindrical inner surfaces of the guide track 30 and 32, and the cylindrical outer surfaces of the collars 28 and 31 are diametrically so proportioned that the collars will roll along the guide tracks as the crankshaft 11 is rotated in its bearings 15 and 13. To that end the effective diameters of the guide tracks 30 and 32 are made twice as large as the effective diameters of the collars 28 and 31, respectively.

The gear teeth 29 of the pinion 23 mesh with gear teeth 33 of an internal ring gear 34 which is rotatably seated in a cylindrical recess 36 of the housing section 8. A cylindrical outer surface and a radial end face of the ring gear 34 bear against cylindrical and radial inner surfaces, respectively, of the recess 36, and a stub shaft 37 integrally formed with the ring gear 34 extends through a central axial aperture 38 of the housing section 8. A seal 39 surrounding the stub shaft 37 is retained in the aperture 38 by a snap ring 41, and a similar seal 42 surrounding the crankshaft journal 10 is retained in an axial aperture 43 of the end cover 9 by a snap ring 44.

In the assembled condition of the mechanism as shown in FIG. 4, the ring gear 34 is axially aligned with the crankshaft journal 10. Also, the ring gear 34 is prevented from rotating about its axis by suitable means not shown in FIGS. 3 and 4, but illustrated by way of example in FIGS. 1 and 2.

Figure 2:
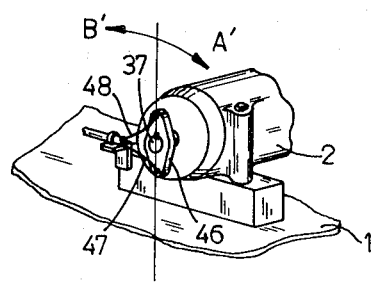
FIG. 2 is a perspective detail view of an adjusting mechanism for the vibration generator shown in FIG. 1.

The ring gear adjusting means illustrated in FIGS. 1 and 2 comprise a double armed rocker 46 (FIG. 2) which is keyed to the stub shaft 37 of the ring gear 34; and cables 47, 48 which are attached to the opposite ends of the rocker. The cables 47, 48 connected with the hand lever 7 in FIG. 1 in such a manner that forward adjustment of the lever 7 from an upright position in the direction of arrow A in FIG. 1 swings the rocker 46 in FIG. 2 from a vertical position in the direction of arrow A', and so that rearward adjustment of the lever 7 in FIG. 1 from its upright position in the direction of arrow B swings the rocker 46 in FIG. 2 from its vertical position in the direction of arrow B'.

As will presently be explained with reference to FIGS. 5 to 9, the vibration generator 2 when driven by the engine 3 functions to produce a straight up and down vibratory thrust when the lever 7 and rocker 46 are positioned vertically. In that case the apparatus shown in FIG. 1 will vibrate up and down but will be subjected to no forward or rearward propelling force.

Alternately, when the lever 7 and rocker 46 are moved to forwardly adjusted positions in the directions of arrows A and A', respectively, the vibration generator 2 produces a downwardly and rearwardly directed vibratory force which in addition to its compacting effect tends to move the apparatus forwardly.

On the other hand, when the lever 7 and rocker 46 are moved to rearwardly adjusted positions in the direction of arrows B and B', respectively, the vibration generator 2 produces a downwardly and forwardly directed vibratory force which in addition to its compacting effect tends to move the apparatus rearwardly.

Figure 5:
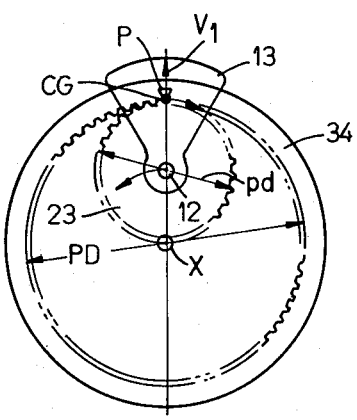
FIGS. 5–9 are diagrammatic views illustrating various operating phases of the vibration generator shown in FIGS. 1, 3 and 4, the views of FIGS. 5–9 being taken in the direction of the arrows E—E in FIG. 4.
Figure 6:
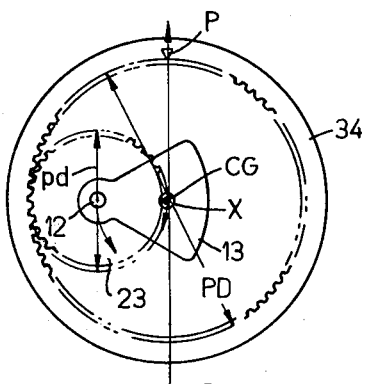
Figure 7:
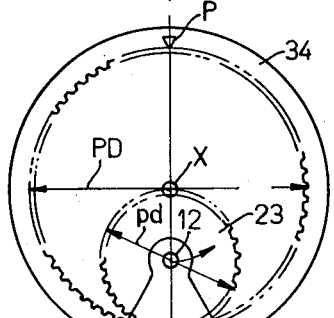

FIGS. 5, 6 and 7 show the ring gear 34 in the rotatively adjusted position in which it is held when the lever 7 (FIG. 1) and the rocker 46 (FIG. 2) are positioned vertically. The pitch diameter PD of the ring gear 34 is twice as large as the pitch diameter $PD$ of the pinion 23; and the radial spacing of the center of gravity CG (FIG. 4) of the weight member 13 from the axis of the crankpin 12 of the crankshaft 11 is equal to the pitch radius of the pinion 23. The gear ratio of the pinion 23 to the ring gear 34 is 1 to 2.

In FIG. 5 the point of mesh of the pinion 23 with the ring gear 34, and also the center of gravity CG of the weight 13 are located on a vertical line through the crankshaft axis X. Centrifugal force of the weight 13 in this condition of the mechanism is a maximum and effective in the direction of the vertical vector V1.

In FIG. 6 the crankpin 12 has moved anticlockwise 90° from its FIG. 5 position, and the center of gravity CG of the weight 13 has moved straight down upon the crankshaft axis X. In this condition of the mechanism the weight 13 exerts no vibratory centrifugal force in any direction.

In FIG. 7 the crankpin 12 has moved anticlockwise 180° from its FIG. 5 position, and the center of gravity CG of the weight 13 has moved straight down from the crankshaft axis X to the point of mesh of the pinion 23 with the ring gear 34. In this condition of the mechanism centrifugal force of the weight 13 is again a maximum but now effective in the direction of the vertical vector V2 which is reversed with respect to the vector V1 in FIG. 5.

Continued anticlockwise rotation of the crankpin 12 from the FIG. 7 position through the remaining 180 degrees of a full revolution, returns the center of gravity CG of the weight 13 straight upward through the crankshaft axis X into the FIG. 5 position, and during such return movement of the center of gravity the centrigugal force of the weight 13 progressively decreases from maximum (FIG. 7) to zero (FIG. 6) and then increases from zero (FIG. 6) to maximum (FIG. 5). It is thus evident that when the lever 7 (FIG. 1) and the rocker 46 are positioned vertically rotation of the crankshaft 11 at high speed either clockwise or anticlockwise generates a strong vibratory straight up and down thrust upon the tamper body 1 without undesirable side components which would impair the operating efficiency of the apparatus and unnecessarily increase its power consumption. The vibratory thrust forces of the orbiting weight 13 are transmitted to the vibrator housing 8, 9 by the collars 28 and 31 rolling on the guide tracks 30, 32, thus insuring smooth and quiet operation of the vibration generator. Lubricant within the housing 8, 9 will reach not only the guide tracks and gear teeth, but will also be supplied to the needle bearing 16 through the recesses 19 and 21 between the prongs 16, 17 and 18 of the weight 13.

Figure 8:
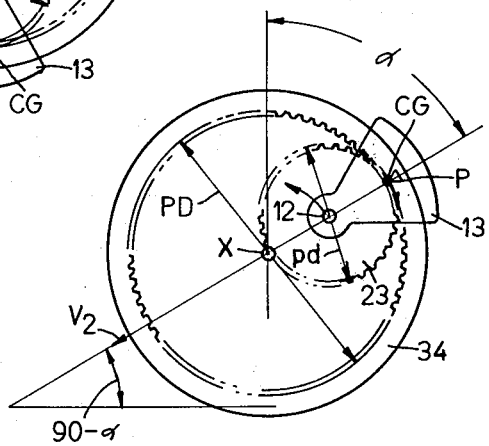

FIG. 8 shows the ring gear 34 rotated clockwise through an angle α from the position in which it is shown in FIG. 5. Such clockwise movement of the ring gear 34 through the angle α due to the meshing engagement of the ring gear teeth with the pinion teeth will put the center of gravity CG of the weight 13 on a line which extends through the crankshaft axis X at an angle of 90° - α relative to the horizontal. In operation, when the crankshaft 11 is rotated at high speed in either direction, the center of gravity CG of the weight 13 moves back and forth on a straight line through the crankshaft axis X as explained hereinbefore with reference to FIGS. 5–7. However, in the case of FIG. 8, that line is inclined downwardly and rearwardly relative to the horizontal, and the thrust vector V2 will, in addition to its compacting effect, subject the apparatus shown in FIG. 1 to a propelling force in a forward direction.

Figure 9:
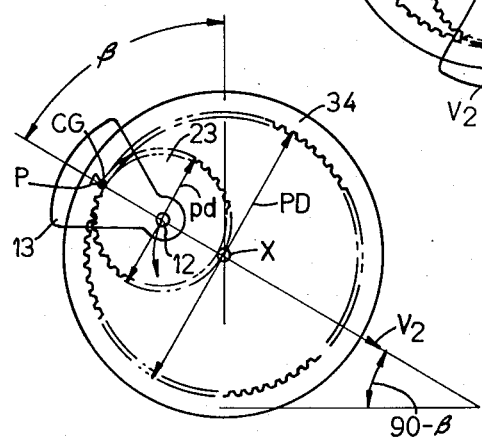

The foregoing explanations with reference to FIG. 8 analogously apply to FIG. 9 which shows the ring gear 34 rotated anticlockwise through an angle β by adjustment of the lever 7 in FIG. 1 in the direction of arrow B. In FIG. 9, the vibratory thrust acts on a line which extends at an angle 90° -β relative to the horizontal. The thrust vector V2 is directed downwardly and forwardly and, in addition to its compacting effect, subjects the apparatus shown in FIG. 1 to a propelling force in a rearward direction.

In a vibratory apparatus such as the compactor shown in FIG. 1, the direction of vibratory thrust sould preferably be variable within a fairly broad angular range such as 120°–150°so that the apparatus may be operated most efficiently under all working conditions and be manipulated conveniently in close quarters. The herein disclosed vibration generator readily lends itself to angular adjustment of the line of vibratory thrust within the desired broad range simply by rotary adjustment of the ring 34.

I claim:

1. A vibration generator comprising, a housing; a crankshaft having a journal and a crankpin within said housing; bearing means in said housing supporting said crankshaft journal for rotation on a horizontal axis; a weight member eccentrically connected with said crankpin in rotatable relation thereto; a pinion in axial alignment with said crankpin non-rotatably secured to said weight member; an internal ring gear in mesh with said pinion mounted in a rotatively fixed position within said housing coaxially with said crankshaft journal; a pair of circular collars non-rotatably connected, respectively, to opposite sides of said weight member in axial alignment with said crankpin; and a pair of annular guide tracks in cooperative engagement with said collars mounted in said housing coaxially with said crankshaft journal, the outside diameter of each of said collars being half as large as the inside diameter of the guide track cooperating therewith.

2. A vibration generator comprising a housing; a crank member having a journal portion mounted in an end wall of said housing for rotation on a horizontal axis and a crank pin within said housing spaced radially from the axis of said journal portion; a weight member eccentrically connected with said crank pin in rotatable relation thereto; an internal ring gear mounted in said housing coaxially with said journal portion of said crank member; peripheral load transmitting means securing said ring gear against rotation relative to said housing; a pinion non-rotatably connected with said weight member coaxially with said crank pin and in mesh with said ring gear; and radial load transmitting means operatively interposed between said weight member and said housing independently of said crank member.

3. A vibration generator as set forth in claim 2 wherein said peripheral load transmitting means are adjustable so as to selectively secure said ring gear in different rotatively adjusted positions relative to said housing.

* * * * *